United States Patent Office
3,205,236
Patented Sept. 7, 1965

3,205,236
PROCESS OF PREPARATION OF β-ALKYLATED TRYPTAMINES
Andre Allais, Paris, and Jean Meier, Coeuilly-Champigny, France, assignors to Roussel-UCLAF, Paris, France, a corporation of France
No Drawing. Filed Mar. 13, 1962, Ser. No. 179,488
Claims priority, application France, Mar. 16, 1961, 855,848; Jan. 5, 1962, 883,991
9 Claims. (Cl. 260—319)

The present invention relates to a new process of preparation of β-alkylated tryptamines and to the novel compounds so produced. More particularly the invention relates to the production of tryptamines of the formula:

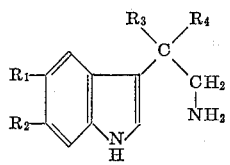

in which $R_1$ and $R_2$ represent radicals selected from the group consisting of hydrogen, lower alkoxy, aryloxy and lower aralkoxy, and $R_3$ and $R_4$ represent radicals selected from the group consisting of hydrogen and lower alkyl, with the proviso that at least one of $R_3$ and $R_4$ is lower alkyl, in the form of the free base or of the mineral or organic acid addition salts.

Tryptamines alkylated in the beta position of the lateral chain have previously been produced by a number of processes, all of which suffer drawbacks and result in low yields. Essentially these processes involved condensation of either a formyl-indole with a nitromethane or an indole with a Grignard reagent and a further alkylation step.

An object of the present invention is the development of a novel process of producing β-alkylated tryptamines with improved yields.

Another object of the invention is the development of a process of producing compounds selected from the group consisting of tryptamines of the formula:

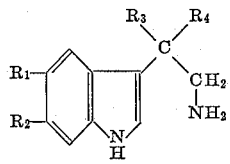

wherein $R_1$ and $R_2$ represent radicals selected from the group consisting of hydrogen, lower alkoxy, aryloxy and lower aralkoxy, and $R_3$ and $R_4$ represent radicals selected from the group consisting of hydrogen and lower alkyl, with the proviso that at least one of $R_3$ and $R_4$ is lower alkyl, and mineral acid addition salts, and organic acid addition salts thereof, starting from the corresponding indolyl-3-acetonitriles.

A further object is the obtention of novel tryptamines selected from the group consisting of β-isopropyl-tryptamine, β-(n-propyl)-tryptamine, 6-methoxy-β,β-dimethyltryptamine, 5-methoxy-β-methyl-tryptamine, β,β-diethyltryptamine and acid addition salts thereof.

A still further object of the invention is the obtention of the novel intermediates:
(a) Compounds having the formula:

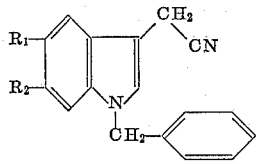

wherein $R_1$ and $R_2$ represent radicals selected from the group consisting of hydrogen, lower alkoxy, aryloxy and lower aralkoxy;
(b) Compounds having the formula:

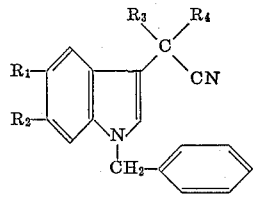

wherein $R_1$ and $R_2$ represent radicals selected from the group consisting of hydrogen, lower alkoxy, aryloxy and lower aralkoxy, and $R_3$ and $R_4$ represent radicals selected from the group consisting of hydrogen and lower alkyl, with the proviso that at least one of $R_3$ and $R_4$ is lower alkyl;
(c) Compounds selected from the group consisting of tryptamines having the formula:

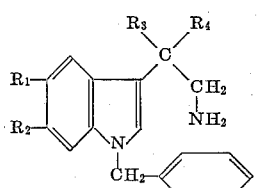

wherein $R_1$ and $R_2$ represent radicals selected from the group consisting of hydrogen, lower alkoxy, aryloxy and lower aralkoxy, and $R_3$ and $R_4$ represent radicals selected from the group consisting of hydrogen and lower alkyl, with the proviso that at least one of $R_3$ and $R_4$ is lower alkyl, and acid addition salts thereof.

These and other objects of the invention will become more apparent as the description thereof proceeds.

The process of the invention is illustrated by the flow diagram of Table I.

TABLE I

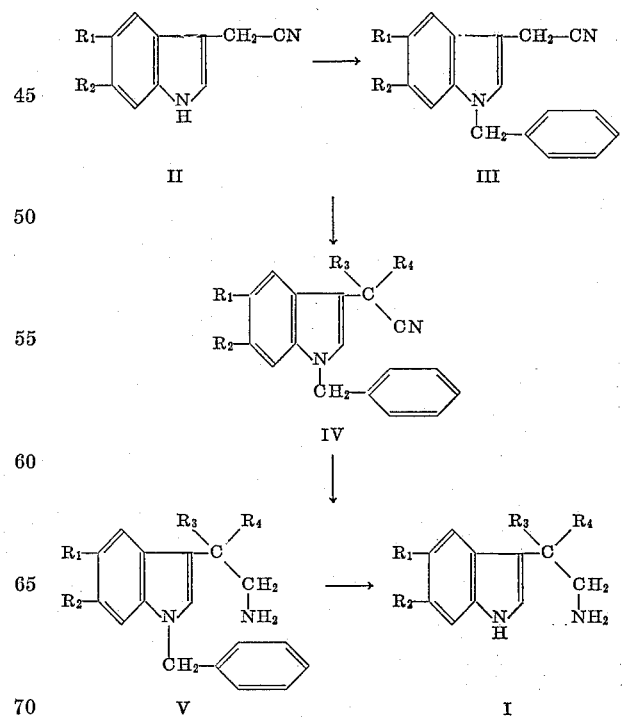

$R_1$, $R_2$, $R_3$ and $R_4$ have the above-assigned meanings.

According to the process of the invention as exemplified by Table I, the indolic nitrogen of an indolyl-3-acetonitrile (II) having the formula:

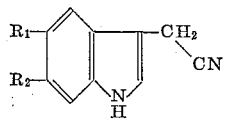

wherein $R_1$ and $R_2$ have the above-assigned meanings, is benzylated by causing a benzyl halide to react on the sodium derivative of the indolic nitrogen group of compound II, then the lateral methylene of the N-substituted indolyl-3-acetonitrile (III) having the formula:

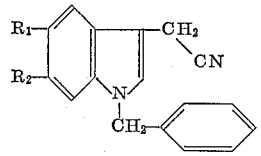

wherein $R_1$ and $R_2$ have the above-assigned meanings is alkylated by reacting a lower alkyl halide on the intermediate sodium derivative formed on the lateral methylene group of compound III. The nitrile group of the alkylated indolyl-3-acetonitrile (IV) having the formula:

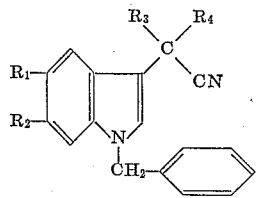

wherein $R_1$, $R_2$, $R_3$ and $R_4$ have the above-assigned values is reduced by action of a mixed hydride and the corresponding tryptamines (V) having the formula:

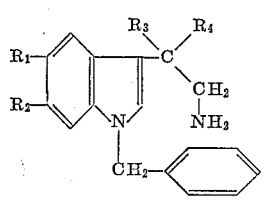

wherein $R_1$, $R_2$, $R_3$ and $R_4$ have the above-assigned values, are obtained, the indolic nitrogen of which is next debenzylated by means of sodium in liquid ammonia in such a manner as to obtain one of the desired $\beta$-alkylated tryptamine compounds.

Preferably the invention is executed according to the following detailed steps. It is to be understood, however, that other expedients may be employed.

(a) The benzylation of the indolic nitrogen of compound II is effected by first preparing the sodium derivative on the indolic nitrogen by reacting the starting indolyl-3-acetonitrile with an about equimolar amount of sodium in anhydrous liquid ammonia while cooling to a temperature below $-40°$ C. and preferably between $-40°$ C. and $-50°$ C. Thereafter, and at about the same temperature, an about equimolar amount of benzyl halide, preferably the chloride, although other halides such as the bromide and fluoride may be utilized, is added and the ammonia is allowed to evaporate.

(b) The alkylation of the lateral chain of compound III is effected by first preparing the sodium derivative of the methylene group of the lateral chain. Compound III is reacted with either one or two molar equivalents of sodium depending on whether a mono- or a di-alkylated compound is desired. The reaction is conducted in anhydrous liquid ammonia while cooling to a temperature below $-40°$ C. and preferably between $-40°$ C. and $-50°$ C. Thereafter, and at about the same temperature, an amount of lower alkyl halide equivalent to the amount of sodium employed is added and the ammonia is allowed to evaporate. Any lower alkyl halide can be employed although the iodide or bromide are preferred, such as methyl iodide, ethyl bromide, isopropyl bromide or n-propyl bromide.

(c) The reduction of the nitrile group of compound IV is effected by means of a mixed metal hydride of aluminum and lithium in an inert organic solvent such as tetrahydrofuran or ether at the reflux temperature.

(d) The debenzylation of compound V is effected by adding sodium to a solution of compound V in ether and anhydrous liquid ammonia. Dry ammonium chloride is then added until the solution is decolorized and the ammonia is allowed to evaporate.

It is possible to obtain, according to the present process, either mono- or di-$\beta$-alkylated tryptamines by varying the molecular proportions of sodium and of alkyl halides used.

Following the process of the invention several novel tryptamines were obtained, namely:

(1) $\beta$-Isopropyl-tryptamine (I, with $R_1$, $R_2$ and $R_3$=H, and

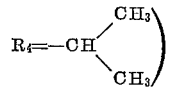

(2) The acetate of $\beta$-isopropyl-tryptamine.

(3) $\beta$-(n-Propyl)-tryptamine (I, with $R_1$, $R_2$ and $R_3$=H, and $R_4$=—$CH_2CH_2CH_3$).

(4) The acetate and the picrate of $\beta$-(n-propyl)-tryptamine.

(5) 6-methoxy-$\beta,\beta$-dimethyl-tryptamine (I, with $R_1$=H, $R_2$=—$OCH_3$, $R_3$ and $R_4$=—$CH_3$).

(6) The acetate of 6-methoxy-$\beta,\beta$-dimethyl-tryptamine.

(7) 5-methoxy-$\beta$-methyl-tryptamine (I, with $R_1$=—$OCH_3$, $R_2$ and $R_3$=H, and $R_4$=—$CH_3$).

(8) The flavianate of 5-methoxy-$\beta$-methyl-tryptamine.

(9) $\beta,\beta$-Diethyl tryptamine (I, with $R_1$ and $R_2$=H, $R_3$ and $R_4$=—$CH_2$—$CH_3$).

The tryptamines prepared according to the invention serve in the preparation of the corresponding deserpidines or of harmanes. The production of deserpidines from tryptamines is disclosed in U.S. Patent No. 2,952,682, for example.

In addition, $\beta$-isopropyl-tryptamine has an exciting effect on the central nervous system, especially when lightly potentialized by an inhibitor of mono-amino oxydase such as iproniazide.

6-methoxy-$\beta,\beta$-dimethyltryptamine possesses an exciting and energizer effect; it possesses an antagonistic effect against the sedative action of reserpine. In strong doses it provokes agitation and perspiration in animals. Its action is potentialized by iproniazide.

5-methoxy-$\beta$-methyltryptamine possesses also an antagonistic action with reference to reserpine.

$\beta,\beta$-Diethyltryptamine possesses also an energizer effect. In strong doses it provokes motor excitation in animals.

The following examples enable a better comprehension of the invention. They are not however deemed limitative and other expedients known to those skilled in the art may be employed.

*Example 1*

PREPARATION OF $\beta,\beta$-DIMETHYL-TRYPTAMINE
(I, WITH $R_1$ AND $R_2$=H, $R_3$ AND $R_4$=—$CH_3$)

*Step A: Preparation of (N-benzyl-indolyl-3)-acetonitrile* (III, with $R_1$ and $R_2$=H).—3 g. (0.13 mol) of sodium were introduced into 200 cc. of dry liquid ammonia in the presence of ferric nitrate. Then a solution of 20.5 g. (0.13 mol) of indolyl-3-acetonitrile in 20 cc. of anhydrous ether were added. Thereafter the reaction mixture was cooled to $-50°$ C. and in about 10 minutes a solution of 16.6 g. (0.13 mol) of benzyl chloride in 20 cc. of ether were added. The mixture was agitated for a period of about 90 minutes while maintaining the interior temperature at $-50°$ C. throughout. The temperature was thereafter allowed to mount in order to evaporate the ammonia.

The residue was taken up with 100 cc. of water, vacuum filtered, then triturated successively several times with 50 cc. of water and dried under vacuum. 27.3 g. of (N-benzyl-indolyl-3)-acetonitrile were obtained, being a yield of 85%. The product could be recrystallized from ethanol. Melting Point: 96° C.

The product was soluble in acetone and chloroform, soluble in hot ethanol, slightly soluble in ether, insoluble in water, dilute aqueous acids and alkalis.

*Analysis.*—$C_{17}H_{14}N_2$; molecular weight=246.30. Calculated: C, 82.90%; H, 5.73%; N, 11.37%. Found: C, 82.6%; H, 5.7%; N, 11.1.

This compound is not described in the literature.

The starting compound was prepared according to the method described by Majima et al., Ber. 1925, 58, 2042.

*Step B: Preparation of (N-benzyl-indolyl-3)-dimethyl-acetonitrile*

(IV, with $R_1$ and $R_2$=H, $R_3$ and $R_4$= —$CH_3$)

515 mg. (.0224 mol) of sodium were introduced into 40 cc. of liquid ammonia in the presence of ferric nitrate. 2.5 g. (.01 mol) of (N-benzyl-indolyl-3)-acetonitrile, obtained according to the preceding step, were then added, while maintaining the interior temperature at —50° C. throughout and holding this temperature for about 30 minutes. 1.4 cc. (.0225 mol) of methyl-iodide were next added slowly while maintaining the interior temperature at —50° C. throughout. The reaction was allowed to continue for a period of about 30 minutes. Then the temperature was allowed to slowly climb which permitted the evaporation of the ammonia. The residue was taken up in 75 cc. of water and vacuum filtered. The filter cake was washed several times with water, triturated with ice-cold alcohol and dried. The product, (N-benzyl-indolyl-3)-dimethylacetonitrile, could be recrystallized from cyclohexane. Melting point: 128° C.

This product was soluble in benzene and chloroform, soluble in hot alcohol and cyclohexane, slightly soluble in ether, insoluble in water, and dilute acids and alkalis.

*Analysis.*—$C_{19}H_{18}N_2$; molecular weight =274.35. Calculated: C, 83.17%; H, 6.61%; N, 10.21%. Found: C, 82.9%; H, 6.8%; N, 10.3%.

This compound is not described in the literature.

*Step C: Preparation of 1-benzyl-β,β-dimethyl tryptamine*

(V, with $R_1$ and $R_2$=H, $R_3$ and $R_4$= —$CH_3$)

500 mg. of mixed lithium aluminum hydride were introduced into 10 cc. of tetrahydrofuran. Then slowly a solution of 1 g. of (N-benzyl-indolyl-3)-dimethyl-aceto-nitrile, obtained according to the preceding step, in 20 cc. of tetrahydrofuran was added. The mixture was heated to reflux for a period of about 2 hours. Next the excess of hydride was destroyed by the addition, first, of 4 cc. of isopropanol, then of 3.75 cc. of water saturated with sodium chloride. The solution was filtered. The precipitate was triturated with ether and the combined extracts were distilled to dryness under vacuum. The oily residue was dissolved in a mixture of 30 cc. of water and 3 cc. of 2 N hydrochloric acid. The solution was treated with animal carbon black, filtered and extracted with ether. The aqueous mother liquors were alkalinized with sodium hydroxide and extracted again with ether. The combined extracts were washed with water, dried over sodium sulfate and distilled to dryness under vacuum. 750 mg. of raw 1-benzyl-β,β-dimethyl-tryptamine were obtained which was used as such for the next step of the synthesis.

This compound was soluble in alcohol, ether, acetone, benzene, chloroform and dilute aqueous acids, insoluble in water and dilute aqueous alkalis.

It is particularly convenient to characterize it in the form of its picrate melting at 184° C.

*Analysis* (of the picrate).—$C_{25}H_{25}O_7N_5$; molecular weight =507.49. Calculated: C, 59.16%; H, 4.97%; N, 13.80%. Found: C, 59.2%; H, 5.1%; N, 13.9%.

This compound is not described in the literature.

*Step D: Preparation of β,β-dimethyl-tryptamine.*—A solution of 20 g. of 1-benzyl-β,β-dimethyl-tryptamine, obtained according to the preceding step, in 25 cc. of ether was introduced into 750 cc. of liquid ammonia. Then in small portions 3.4 g. of sodium were introduced (until the solution took on a deep and durable blue-green coloration), and next, slowly, dry ammonium chloride was added until the solution was decolorized. Then the ammonia was allowed to evaporate. The residue was taken up by a mixture of 250 cc. of water and 250 cc. of ether, subjected to agitation and decanted. The ethereal phase was washed with water and extracted three times by a mixture of 350 cc. of water and 100 cc. of 2 N hydrochloric acid. The combined extracts were washed with ether, decanted, treated with animal carbon black, filtered and alkalinized by an ammonia solution. The gummy precipitate was extracted with ether. The ethereal extract was dried over sodium sulfate and evaporated to dryness under vacuum. The raw product was taken up with boiling cyclohexane, treated with animal carbon black and filtered while hot. The purified solution was allowed to stand overnight at +10° C., then refiltered. The crystals obtained were triturated twice with cyclohexane and dried. 8.1 g. of β,β-dimethyl-tryptamine were obtained having a melting point of 105–106° C.

This compound was soluble in alcohol, ether, acetone, benzene, chloroform, and dilute aqueous acids, soluble in hot cyclohexane, insoluble in water and dilute aqueous alkalis.

*Analysis.*—$C_{12}H_{16}N_2$; molecular weight =188.26. Calculated: C, 76.55%; H, 8.57%; N, 14.88%. Found: C, 76.6%; H, 8.5%; N, 15.1%.

This compound was described by Jonsson, Svensk, Kem. Tidskr. 1955, 67, 188.

It is particularly convenient to characterize it in the form of its picrate, having a melting point of 228° C±1°, which is obtained by the action of a saturated solution of picric acid in ethanol.

*Example II*

PREPARATION OF β-ISOPROPYL-TRYPTAMINE (I, WITH $R_1$, $R_2$ AND $R_3$=H,

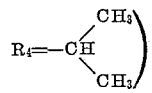

*Step A: Preparation of (N-benzyl-indolyl-3)-isopropyl-acetonitrile* (IV, with $R_1$, $R_2$ and $R_3$=H,

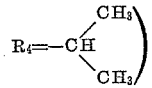

1.05 g. (.046 mol) of sodium were introduced into 100 cc. of liquid ammonia in the presence of ferric nitrite. The solution was cooled to —50° C. and 10.5 g. (.043 mol) of (N-benzyl-indolyl-3)-acetonitrile, obtained according to Example I, Step A, were introduced. Next, slowly over the course of about 15 minutes while maintaining the temperature at —50° C. a solution of 4.8 cc. (.051 mol) of isopropyl bromide in 10 cc. of ether was added. The solution was agitated for about 2 hours at —50° C. The temperature was allowed to mount and the ammonia evaporated. Then 100 cc. of water were added. The solution was agitated for a period of 10 minutes and filtered. The residue was washed several times with water and dried at room temperature under vacuum.

10.5 g. of (N-benzyl-indolyl-3)-isopropyl-acetonitrile were obtained which was used as such for the following step.

The raw product could be purified by dissolving in hot cyclohexane and precipitating by cooling. The precipitate was taken up with isopropyl ether and slowly crystallized.

The pure product had a melting point of 75° C.±2°.

The compound was soluble in alcohol, ether, acetone, hot cyclohexane and hot isopropyl ether, insoluble in water, and dilute aqueous acids and alkalis.

*Analysis.*—$C_{20}H_{20}N_2$; molecular weight=288.38. Calculated: C, 83.3%; H, 6.99%; N, 9.71%. Found: C, 83.1%; H, 7.1%; N, 9.7%.

This compound is not described in the literature.

*Step B: Preparation of 1-benzyl-β-isopropyl-tryptamine* (V, with $R_1$, $R_2$ and $R_3$=H, and

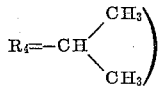

3 g. of mixed lithium aluminum hydride were introduced into 30 cc. of ether. Then slowly over a period of about 15 minutes a solution of 10.5 g. of (N-benzyl-indolyl-3) - isopropyl - acetonitrile, obtained according to the preceding step, in 70 cc. of ether was added. The reaction mixture was maintained at reflux temperature for a period of about 2 hours, then cooled. Successively, 12 cc. of isopropanol and then 11 cc. of water saturated with sodium chloride were added. The solution was agitated for about 30 minutes and filtered. The precipitate was triturated several times with ether. The combined ethereal extracts were treated with a solution of 40 cc. of N hydrochloric acid in 100 cc. of water. The aqueous solution was separated and 50 cc. of 1 N sodium hydroxide solution were added thereto. The oily phase was extracted with 100 cc. of ether. The aqueous layer was washed with ether. The combined ethereal extracts were washed with water and dried over sodium sulfate. Then the ether was distilled off under vacuum and 9.2 g. of 1-benzyl - β - isopropyl - tryptamine were recovered which were used as such for the following step.

It was particularly convenient to characterize the compound in the form of a picrate having a melting point of 140° C.±2°. The compound was soluble in acetone, benzene, chloroform, hot alcohol and insoluble in water and ether. Dilute aqueous acids and alkalis decomposed it.

This compound is not described in the literature.

*Analysis* (of the picrate).—$C_{26}H_{27}O_7N_5$; molecular weight=521.52. Calculated: C, 59.87%; H, 5.22%; N, 13.43%. Found: C, 59.8%; H, 5.5%; N, 13.6%.

*Step C: Preparation of β-isopropyl-tryptamine.*—A solution of 9.2 g. of 1-benzyl-β-isopropyl-tryptamine, obtained according to the preceding step, in 20 cc. of ether was introduced into 100 cc. of ammonia. 1.4 g. of sodium were added thereafter in small amounts over a period of about 30 minutes. Then dry ammonium chloride was added until the solution was decolorized. Next the ammonia was allowed to evaporate. The residue was taken up by a mixture of 100 cc. of water and 100 cc. of ether. The organic phase was separated, washed several times with water and extracted by a solution of 35 cc. of N hydrochloric acid in 100 cc. of water. To the aqueous acidic extract, 40 cc. of N sodium hydroxide solution were added.

The oil formed was extracted with ether. The ethereal phase was washed with water, dried over sodium sulfate and evaporated to dryness. 4.9 g. of raw β-isopropyl-tryptamine were obtained.

This compound is not described in the literature.

This compound could be transformed into the acetate in the following fashion: 4 g. of β-isopropyl-tryptamine were dissolved in 50 cc. of methylene chloride. 1.2 cc. of acetic acid were added and the mixture was allowed to stand in the cold. The crystals formed were vacuum filtered, triturated several times with methylene chloride, then with ether and dried. 4.5 g. of the acetate of β-isopropyl-tryptamine were obtained having a melting point of 150–160° C. with decomposition.

*Analysis* (of the acetate).—$C_{15}H_{22}N_2O_2$; molecular weight=262.34. Calculated: C, 68.67%; H, 8.46%; N, 10.68%. Found: C, 68.5%; H, 8.5%; N, 10.6%.

This compound is not described in the literature.

The free base, obtained by treating the acetate with ammonia solution, melted at 116° C.

This compound is not described in the literature.

*Example III*

PREPARATION OF β-N-PROPYL TRYPTAMINE (I, WITH $R_1$, $R_2$ AND $R_3$=H AND $R_4$=—$CH_2$—$CH_2$—$CH_3$)

*Step A: Preparation of α-[N-benzyl-indolyl-3]-valero-nitrile* (IV, with $R_1$, $R_2$ and $R_3$=H, and $$R_4=—CH_2—CH_2—CH_3)$$

2.46 g. (.107 mol) of sodium were introduced in 200 cc. of ammonia in the presence of ferric nitrate. Then 24.2 g. (.098 mol) of (N-benzyl-indolyl-3)-acetonitrile, obtained according to Example I, Step A, were added. The solution was agitated for a period of 30 minutes at about −40° C. It was then cooled to −50° C. A mixture of 9 cc. (.099 mol) of propyl bromide and 15 cc. of ether was slowly added. The reaction mixture was maintained for a period of about 2 hours at −50° C. Next the ammonia was allowed to evaporate. The residue was taken up with 200 cc. of water and agitated for a half hour. The precipitate was vacuum filtered, washed with water triturated with 2 N hydrochloric acid, washed again with water until the wash waters were neutral, vacuum filtered and dried for a period of 24 hours under vacuum. 26 g. of raw α-[N-benzyl-indolyl-3]-valeronitrile were obtained which were used as such for the following step.

The product could be recrystallized from cyclohexane and had a melting point of 70° C. thereafter.

The product was soluble in alcohol, ether, acetone, benzene and chloroform, soluble in hot cyclohexane, insoluble in water, dilute aqueous acids and alkalis.

*Analysis.*—$C_{20}H_{20}N_2$; molecular weight=288.38. Calculated: C, 83.3%; H, 6.99%; N, 9.71%. Found: C, 83.5%; H, 6.9%; N, 9.6%.

This compound is not described in the literature.

*Step B: Preparation of 1-benzyl-β-(n-propyl)-tryptamine* (V, with $R_1$, $R_2$ and $R_3$=H, $$R_4=—CH_2—CH_2—CH_3)$$

20 g. of mixed lithium aluminum hydride were introduced in 250 cc. of ether. Then slowly over a period of about 30 minutes a solution of 71.8 g. of α-[N-benzyl-indolyl-3]-valeronitrile, obtained according to the preceding step, in 500 cc. of ether was added. The reaction mixture was held at reflux temperatures for a period of two hours and cooled by an ice bath. The excess of mixed hydride was destroyed by successive additions of 80 cc. of isopropanol and then 75 cc. of a saturated solution of sodium chloride. The mixture was filtered. The precipitate was triturated several times with ether. The combined ethereal phases were extracted by a solution of 35 cc. of concentrated hydrochloric acid in 250 cc. of water. The aqueous layer was separated, treated with animal carbon black, filtered and 50 cc. of concentrated sodium hydroxide were added thereto. Next, the aqueous solution was extracted with 250 cc. of ether. The ethereal solution was washed with water until the wash waters were neutral, dried over sodium sulfate and distilled to dryness under vacuum. 62.5 g. of raw 1-benzyl-β-(n-propyl)-trytamine were obtained which were used as such for the following step.

This compound is not described in the literature.

It was particularly convenient to characterize the compound in the form of its picrate having a melting point of 160° C.±2°.

The compound was soluble in alcohol and acetone, slightly soluble in benzene and ether, insoluble in water; dilute aqueous acids and alkalis decomposed it.

*Analysis* (of the picrate). — $C_{26}H_{27}O_7N_5$; molecular weght=521.52. Calculated: C, 59.87%; H, 5.22%; O, 21.48%; N, 13.43%. Found: C, 59.8%; H, 5.3%; O, 21.5%; N, 13.6%.

This compound is not described in the literature.

*Step C: Preparation of β-(n-propyl)-tryptamine.*—A solution of 20.4 g. of 1-benzyl-β-(n-propyl)-tryptamine, obtained according to the preceding step, in 25 cc. of ether was introduced rapidly into 250 cc. of ammonia under agitation. Then, by small fraction over about a half hour, 3.4 g. of sodium were added. Next, ammonium chloride was slowly added until the solution was decolorized. Finally the ammonia was allowed to evaporate. The residue was taken up with 200 cc. of water and 200 cc. of ether and agitated. Then, the ethereal layer was separated. It was washed several times with water and extracted with 100 cc. of N hydrochloric acid. Next the aqueous phase was washed with ether. Then 120 cc. of N sodium hydroxide solution were added. The freed tryptamine was extracted with ether. The ethereal extracts were washed with water until the wash waters were neutral, dried over sodium sulfate and distilled to dryness. 13.8 g. of raw β-(n-propyl)-tryptamine were thus recovered.

This compound is not described in the literature.

This compound could be transformed into the acetate in the following manner. The raw product obtained as above was dissolved in 50 cc. of methylene chloride. 4.2 cc. of acetic acid were added while cooling. The precipitate formed was next vacuum filtered, triturated successively with methylene chloride and with ether and dried. 12 g. of the acetate of β-(n-propyl)-tryptamine were obtained which could be recrystallized from ethyl acetate or cyclohexane to give a product having a melting point of 136° C.±2°.

This compound was soluble in water, alcohol, acetone, slightly soluble in benzene and chloroform, soluble in hot ethyl acetate and cyclohexane, and insoluble in ether.

*Analysis* (of the acetate). — $C_{15}H_{22}O_2N_2$; molecular weight=262.34. Calculated: C, 68.67%; H, 8.46%; N, 10.68%. Found: C, 68.6%; H, 8.5%; N, 10.8%.

This compound is not described in the literature.

One could, in an equivalent manner, prepare the picrate which, recrystallized from alcohol, melted at 248° C.

This compound is not described in the literature.

*Example IV*

PREPARATION OF 6-METHOXY-β,β-DIMETHYL-TRYPTAMINE (I, WITH $R_1$=H, $R_2$=—$OCH_3$ and $R_4$=—$CH_3$)

*Step A: Preparation of (N-benzyl-6-methoxy-indolyl-3)-acetonitrile* (III, $R_1$=H and $R_2$=—$OCH_3$).—1.250 g. (.054 mol) of sodium were introduced in small fractions into 100 cc. of ammonia in the presence of ferric nitrate. Then the solution was cooled to —50° C. and 10 g. (.054 mol) of (6-methoxy-indolyl-3)-acetonitrile were added rapidly. Next, slowly, while maintaining the temperature at —50° C., a solution of 6.2 cc. (.054 mol) of benzyl chloride in 10 cc. of ether was added and the reaction mixture was agitated for a period of about 2 hours at the same temperature. Then, the ammonia was allowed to evaporate. The residue was taken up with 100 cc. of water, agitated for about 10 minutes, vacuum filtered, washed successively with water until the wash waters were neutral, then twice with ethanol and finally with ether. 11.4 g. of raw (N-benzyl-6-methoxy-indolyl-3)-acetonitrile were obtained which were used as such for the following step of the synthesis.

The product could be purified by recrystallization from ethanol to give a product melting at 95° C.±1°.

It was soluble in acetone, chloroform, slightly soluble in alcohol, and insoluble in benzene, ether, water, dilute aqueous acids and alkalis.

*Analysis.*—$C_{18}H_{16}ON_2$; molecular weight=276.32. Calculated: C, 78.23%; H, 5.84%; N, 10.14%. Found: C, 78.4%; H, 6.0%; N, 10.3%.

This compound is not described in the literature.

The starting compound was prepared according to the method described by Akabori et al., Ber. 63, 2247.

*Step B: Preparation of (N-benzyl-6-methoxy-indolyl-3)-dimethyl-acetonitrile* (IV, with $R_1$=H, $R_2$=—$OCH_3$, $R_3$ and $R_4$=—$CH_3$).—2.100 g. (.091 mol) of sodium were introduced in small amounts in 100 cc, of liquid ammonia in the presence of ferric nitrate. Then the solution was cooled to —50° C. and 10 g. (.036 mol) of raw (N-benzyl-6-methoxy-indolyl-3)-acetonitrile, obtained according to the preceding step, were added rapidly. Then over a period of about 15 minutes, while maintaining the temperature at —50° C., a solution of 6.4 cc. (.103 mol) of methyl iodide in 10 cc. of anhydrous ether was introduced. The mixture was agitated for a period of about 2 hours at —50° C. Then the ammonia was allowed to evaporate. 100 cc. of water were added and the agitation was continued for about 10 minutes.

The crystalline precipitate was vacuum filtered, washed successively with water until the wash waters were neutral, with ethanol, and with ether, then dried under vacuum. 10 g. of raw (N-benzyl-6-methoxy-indolyl-3)-dimethyl-acetonitrile were obtained which were used as such for the following step of the synthesis.

The product could be purified by successive recrystallizations from ethanol and had a melting point of 135° C.±1°.

It was soluble in acetone and chloroform, slightly soluble in alcohol, and insoluble in water, ether, benzene and dilute aqueous acids and alkalis.

*Analysis.*—$C_{20}H_{20}ON_2$; molecular weight=304.38. Calculated: C, 78.92%; H, 6.62%; N, 9.20%. Found: C, 78.8%; H, 6.5%; N, 9.4%.

This compound is not described in the literature.

*Step C: Preparation of 1-benzyl-6-methoxy-β,β-dimethyl-tryptamine* (V, with $R_1$=H, $R_2$=—$OCH_3$, $R_3$ and $R_4$=—$CH_3$).—2.5 g. of mixed lithium aluminum hydride were introduced into 20 cc. of tetrahydrofuran. Then slowly over a period of about 40 minutes, a solution of 9 g. of (N-benzyl-6-methoxy-indolyl-3)-dimethyl-acetonitrile, obtained according to the preceding step, in 80 cc. of tetrahydrofuran was added. The reaction mixture was maintained at reflux for a period of about 2 hours after the end of the introduction of the above-mentioned solution. The excess of the mixed hydride was next destroyed by successive additions of 12 cc. of isopropanol and then 11.5 cc. of a saturated solution of sodium chloride. The precipitate was filtered and washed with ether. The combined filtrate was concentrated under vacuum and the oily residue was taken up in 100 cc. of ether. The ethereal solution was next extracted with N hydrochloric acid. To the acid extract sodium hydroxide solution was added in excess and the solution was extracted again with ether. The ethereal phase was washed with water until the wash waters were neutral, dried over sodium sulfate and concentrated under vacuum. 6 g. of raw 1-benzyl-6-methoxy-β,β-dimethyl-tryptamine were obtained.

This compound is not described in the literature.

It is particularly convenient to characterize the product in the form of its picrate melting at 220° C.±1°.

This compound was slightly soluble in acetone and chloroform, and insoluble in ether, benzene and water.

*Analysis* (of the picrate).—$C_{26}H_{27}O_8N_5$; molecular weight=537.52. Calculated: C, 58.09%; H, 5.06%; N, 13.03%. Found: C, 58.2%; H, 5.3%; N, 13.2%.

This compound is not described in the literature.

*Step D: Preparation of 6-methoxy-β,β-dimethyl-tryptamine.*—A solution of 5 g. of 1-benzyl-6-methoxy-β,β-dimethyl tryptamine, obtained according to the preceding step, in 10 cc. of ether was introduced rapidly under cooling into 100 cc. of liquid ammonia. Then 0.900 g. of sodium were added in small amounts over a period of from about 45 to 60 minutes. Ammonium chloride was added until the solution was decolorized. The ammonia was allowed to evaporate. The residual oil was taken up with 100 cc. of water and 50 cc. of ether and agitated vigorously for a period of about 10 minutes. The aqueous phase was then separated, washed several times with ether. The ethereal phases were combined and the tryptamine was extracted by several extractions with N hydrochloric acid. The acid phase was treated then with sodium hydroxide in excess. Thereafter, it was extracted several times with ether. The ethereal extracts were combined, washed with water until the wash waters were neutral, dried over sodium sulfate, filtered and dried under vacuum. 2.6 g. of raw 6-methoxy-$\beta,\beta$-dimethyl-tryptamine were obtained.

This compound is not described in the literature.

It was particularly convenient to characterize it in the form of its acetate melting at 142° C.±4°.

This compound was slightly soluble in alcohol, acetone and ethyl acetate, and insoluble in ether, benzene, chloroform and water.

*Analysis* (of the acetate).—$C_{15}H_{22}O_3N_2$; molecular weight=278.34. Calculated: C, 64.72%; H, 7.97%; N, 10.07%. Found: C, 65.0%; H, 8.1%; N, 10.1%.

This compound is not described in the literature.

Example V

PREPARATION OF 5-METHOXY-$\beta$-METHYL-TRYPTAMINE (I, WITH $R_1$=—$OCH_3$, $R_2$ AND $R_3$=H, AND $R_4$=—$CH_3$

*Step A: Preparation of (N-benzyl-5-methoxy-indolyl-3)-acetonitrile* (III with $R_1$=—$OCH_3$, $R_2$=H).—13. g. (.565 mol) of sodium were introduced into 1 liter of ammonia in the presence of ferric nitrate. 100 g. (.538 mol) of (5-methoxy-indolyl-3) - acetonitrile were then introduced. The solution was cooled to —50° C. and 65 cc. (.565 mol) of benzyl chloride were slowly added. The reaction mixture was maintained for a period of about 2 hours at —50° C. The ammonia was next allowed to evaporate. The residue was taken up with 1000 cc. of water and agitated for a period of a half hour. It was triturated successively several times with water, then with methanol, and then with ether and dried under vacuum. 107 g. of raw (N-benzyl-5-methoxy-indolyl-3)-acetonitrile were obtained which were used as such for the following step and which could be purified from ethanol to give a product melting at 79° C.

This compound was soluble in chloroform, hot methanol and insoluble in water and dilute aqueous acids and alkalis.

*Analysis.*—$C_{18}H_{16}ON_2$; molecular weight=276.32. Calculated: C, 78.23%; H, 5.84%; N, 10.14%. Found: C, 78.3%; H, 5.8%; N, 10.4%.

This compound is not described in the literature.

The starting compound is prepared according to the method described by Akabori et al., Ber. 63, 2247.

*Step B: Preparation of (N-benzyl-5-methoxy-indolyl-3)-methyl-acetonitrile* (IV, with $R_1$=—$OCH_3$, $R_2$ and $R_3$=H, and $R_4$=—$CH_3$).—540 mg. (.023 mol) of sodium were introduced into 100 cc. of ammonia in the presence of ferric nitrate. 6.3 g. (.023 mol) of (N-benzyl-5-methoxy-indolyl-3-)-acetonitrile, obtained according to the preceding step, were introduced. The solution was cooled to —50° C. and slowly 1.42 cc. (.023 mol) of methyl iodide were added. The reaction mixture was maintained for a period of about one hour at —50° C. Then the ammonia was allowed to evaporate. The residue was taken up with 100 cc. of water, agitated for a period of a half hour, vacum filtered, washed with water and dried under vacuum. 5.3 g. of (N-benzyl-5-methoxy-indolyl-3)-methyl - acetonitrile were obtained melting at 60° C.±10°, which was used as such for the next step.

This compound was soluble in alcohol, ether, acetone and benzene, and insoluble in water and dilute aqueous acids and alkalis.

*Analysis.* — $C_{19}H_{18}ON_2$; molecular weight=290.35. Calculated: C, 78.59%; H, 6.25%; N, 9.65%. Found: C, 78.5%; H, 6.4%; N, 9.7%.

This compound is not described in the literature.

*Step C: Preparation of 1-benzyl-5-methoxy-$\beta$-methyl-tryptamine* (V, with $R_1$=—$OCH_3$, $R_2$ and $R_3$=H, and $R_4$=—$CH_3$).—700 mg. of mixed lithium aluminum hydride were introduced into 20 cc. of ether. Then slowly a solution of 4.8 g. of (N-benzyl-5-methoxy-indolyl - 3)-methyl-acetonitrile, prepared according to the preceding step, in 20 cc. of anhydrous ether was added. The reaction mixture was maintained at reflux temperature for a period of about 1 hour, then cooled. Successively 4 cc. of isopropanol and 3.75 cc. of a saturated sodium chloride solution were added. The mixture was agitated for a period of about 15 minutes and filtered. The precipitate was triturated several times with ether. The combined ethereal extracts were treated with a dilute solution of hydrochloric acid. The aqueous phase was separated, washed with ether, treated with animal carbon black and filtered. An excess of a dilute ammonia solution was added. The oily phase was extracted with ether. The ethereal extracts were washed with water until the wash waters were neutral, dried over sodium sulfate and then the ether was distilled off under vacuum. 3.5 g. of raw 1-benzyl-5-methoxy-$\beta$-methyl - tryptamine were recovered which were used as such for the following step.

This compound was soluble in acetone, alcohol, ether, benzene, chloroform and dilute aqueous acids, and insoluble in water and dilute aqueous alkalis.

This compound is not described in the literature.

*Step D: Preparation of 5-methoxy - $\beta$ - methyl - tryptamine.*—A solution of 3 g. of 1-benzyl-5-methoxy-$\beta$-methyl-tryptamine, obtained according to the preceding step, in 10 cc. of ether was introduced into 50 cc. of ammonia. Then 250 mg. of sodium were added in small amounts and thereafter dry ammonium chloride was added slowly until the soltuion was decolorized. The ammonia was next allowed to evaporate. The residue was taken up by a mixture of water and ether. The ethereal phase was separated. It was extracted with a dilute hydrochloric acid solution. The aqueous phase was separated, filtered and washed with ether. Dilute ammonium solution was added to the aqueous phase which was treated previously with animal carbon black. The oil formed was extracted with ether. The ethereal extracts were washed with water until the wash waters were neutral, and then dried over sodium sulfate and evaporated to dryness under vacuum. 1.24 g. of raw 5-methoxy-$\beta$-methyl-tryptamine were obtained.

This compound is not described in the literature.

It was particularly convenient to characterize the compound in the form of the flavianate having a melting point of 155° C.±3°. This compound was soluble in hot alcohol, insoluble in water and ether. Dilute aqueous acids and alklis decomposed it.

This compound is not described in the literature.

Example VI

PREPARATION OF $\beta,\beta$-DIETHYL-TRYPTAMINE (I, WITH $R_1$ AND $R_2$=H, $R_3$ AND $R_4$=—$CH_2$—$CH_3$)

*Step A: Preparation of (N-benzyl-indolyl-3)-diethyl acetonitrile* (IV, with $R_1$ and $R_2$=H, $R_3$ and $R_4$=—$CH_2$—$CH_3$)

11.5 g. (.50 mol) of sodium were introduced into 750 cc. of dry liquid ammonia in the presence of ferric nitrate. Then when the amidide was formed, 49.2 g. (.20 mol) of (N-benzyl-indolyl-3)-acetonitrile, obtained according to the procedure of Example I, Step A, were added while maintaining the interior temperature at —50° C. throughout. Next, slowly over a period of about 30 minutes, 42 cc. (.56 mol) of ethyl bromide were added while maintaining the interior temperature at —50° C. throughout. The reaction was allowed to continue at this temperature for a period of about 1 hour. Then the temperature was allowed to rise to room temperature which allowed the evaporation of the ammonia. The oily residue was taken up by a mixture of water and ether and then decanted. The ethereal fraction was washed with dilute hydrochloric acid, then with water, dried over sodium sulfate and distilled to dryness. The residue was taken up with benzene which was distilled off in order to obtain 56.5 g. of raw (N-benzyl-indolyl-3)-diethyl-acetonitrile which was used as such for the following step of the synthesis.

This product is not described in the literature.

*Step B: Preparation of 1-benzyl-β,β-diethyl-tryptamine* (V, with $R_1$ and $R_2$=H, $R_3$ and $R_4$=—$CH_2$—$CH_3$).— 16 g. of mixed lithium aluminum hydride were introduced into 100 cc. of ether. Then slowly a solution of 55 cc. of (N-benzyl-indolyl-3)-diethyl-acetonitrile, prepared according to the preceding step, in 250 cc. of ether was added. The reaction mixture was heated to reflux temperature for a period of about 2 hours. The solution was cooled next. Then the complex and the excess of hydride were destroyed by the addition of 128 cc. of isopropanol first, then 120 cc. of water saturated with sodium chloride. The solution was filtered. The precipitate was triturated several times with ether which was evaporated to dryness under vacuum. The residue was dissolved in 250 cc. of ether and extracted with dilute hydrochloric acid. The acidic extracts were washed with ether and dilute sodium hydroxide was added thereto until the pH became distinctly alkaline. The solution was extracted with benzene. The benzenic extract was washed with water until the wash waters were neutral, dried over sodium sulfate and distilled to dryness under vacuum. 46.5 g. of raw 1-benzyl-β,β-diethyl-tryptamine were obtained which were used as such for the following step of the synthesis.

The compound was soluble in alcohol, ether, acetone, benzene, chloroform and dilute aqueous acids, and insoluble in water and dilute aqueous alkalis.

This compound is not described in the literature.

It could be characterized in the form of the benzoate which was obtained by the following treatment: 1 g. of raw 1-benzyl-β,β-diethyl-tryptamine was dissolved in 15 cc. of hot benzene. A solution of 0.7 g. of benzoic acid in 5 cc. of hot benzene was added and the mixture was allowed to stand for a period of about 48 hours. The crystals were vacuum filtered next and triturated several times with ether and dried. 1.3 g. of the benzoate of 1-benzyl-β,β-diethyl-tryptamine were thus obtained which could be purified by recrystallization from benzene to give a product having a melting point of 159–160° C.

The product was soluble in water and alcohol, slightly soluble in benzene, insoluble in ether.

*Analysis* (of the benzoate).—$C_{28}H_{32}O_2N_2$; molecular weight=428.55. Calculated: C, 78.5%; H, 7.5%; N, 6.5%. Found: C, 78.7%; H, 7.6%; N, 6.5%.

This compound is not described in the literature.

*Step C: Preparation of β,β-diethyl-tryptamine.*—A solution of 40 g. of 1-benzyl-β,β-diethyl-tryptamine, obtained according to the preceding step, in 40 cc. of ether was introduced into 1000 cc. of dry liquid ammonia and rinsed with 30 cc. of ether. 6.7 g. of sodium were then introduced by small fractions (until the solution took on a strong and durable blue-green color). Next, slowly, dry ammonium chloride was added until the solution became decolorized. The ammonia was allowed to evaporate. The residue was taken up with an excess of dilute hydrochloric acid and extracted with ether. The aqueous phase was treated with animal carbon black, filtered, cooled by a water and ice bath, and a dilute sodium hydroxide solution was added under agitation until the pH reached 8. The solution was filtered and sodium hydroxide solution was added in excess. The crystals formed were vacuum filtered, washed with water and dried under vacuum. 20 g. of β,β-diethyl-tryptamine were thus obtained which could be recrystallized from hot cyclohexane to give a product having a melting point of 124° C.

The product was soluble in alcohol, acetone, benzene, chloroform and dilute aqueous acids, moderately soluble in ether, soluble in hot cyclohexane, and insoluble in water.

*Analysis.*—$C_{14}H_{20}N_2$; molecular weight=216.32. Calculated: C, 77.73%; H, 9.32%; N, 12.95%. Found: C, 78.0%; H, 9.1%; N, 13.1%.

This compound is not described in the literature.

The preceding specific embodiments enable a better comprehension of the invention. They are not to be deemed limitative and other expedients known to those skilled in the art may be employed without departing from the spirit of the invention and the scope of the appended claims.

We claim:

1. A process for the production of compounds selected from the group consisting of tryptamines of the formula:

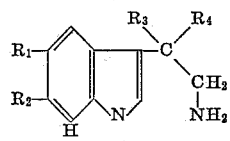

wherein $R_1$ and $R_2$ are selected from the group consisting of hydrogen and lower alkoxy and $R_3$ and $R_4$ are selected from the group consisting of (1) one hydrogen and one lower alkyl and (2) two lower alkyl, and mineral acid addition salts, and organic acid addition salts thereof, which comprises the steps of (a) reacting an indolyl-3-acetonitrile of the formula:

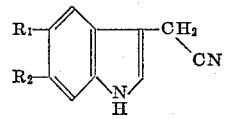

wherein $R_1$ and $R_2$ have the above-assigned values, with an about equimolar amount of sodium in anhydrous liquid ammonia and adding a benzyl halide thereto, (b) reacting the N-benzylated derivative of the formula:

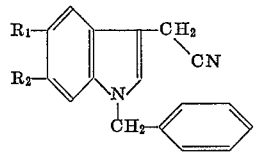

wherein $R_1$ and $R_2$ have the above-assigned values, with sodium in anhydrous liquid ammonia and adding a lower alkyl halide thereto, (c) refluxing the alkylated acetonitrile of the formula:

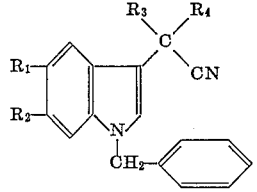

where $R_1$, $R_2$, $R_3$ and $R_4$ have the above-assigned values with a mixed hydride in an inert organic solvent, (d) reacting the tryptamine of the mormula:

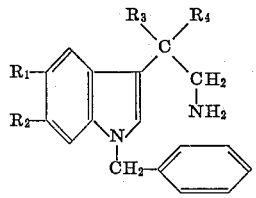

wherein $R_1$, $R_2$, $R_3$ and $R_4$ have the above-assigned values with sodium in anhydrous liquid ammonia, and (e) recovering said compounds.

2. The process of claim 1 (a), wherein said benzyl halide is benzyl chloride.

3. The process of claim 1 (c), wherein said mixed hydride is lithium aluminum hydride.

4. The process of claim 1 wherein the starting compound is indolyl-3-acetonitrile and the lower alkyl halide is methyl iodide whereby β,β-dimethyl-tryptamine is recovered.

5. The process of claim 1 wherein the starting compound is indolyl-3-acetonitrile and the lower alkyl halide is isopropyl bromide whereby β-isopropyl-tryptamine is recovered.

6. The process of claim 1 wherein the starting compound is indolyl-3-acetonitrile and the lower alkyl halide is n-propyl bromide whereby β-(n-propyl)-tryptamine is recovered.

7. The process of claim 1 wherein the starting compound is 6-methoxy-indolyl-3-acetonitrile and the lower alkyl halide is methyl iodide whereby 6-methoxy-β,β-dimethyltryptamine is recovered.

8. The process of claim 1 wherein the starting compound is 5-methoxy-indolyl-3-acetonitrile and the lower alkyl halide is methyl iodide whereby 5-methoxy-β-methyl-tryptamine is recovered.

9. The process of claim 1 wherein the starting compound is indolyl-3-acetonitrile and the lower alkyl halide is ethyl bromide whereby β,β-diethyl-tryptamine is recovered.

References Cited by the Examiner

UNITED STATES PATENTS

| | | | |
|---|---|---|---|
| 2,959,591 | 11/60 | Petrzilka et al. | 260—319 |
| 3,042,684 | 7/62 | Young | 260—319 |
| 3,072,530 | 1/63 | Hofmann et al. | 167—65 |

FOREIGN PATENTS

| | | |
|---|---|---|
| 744,773 | 2/56 | Great Britain. |
| 1,187,064 | 3/59 | France. |
| 1,199,603 | 6/59 | France. |

OTHER REFERENCES

Ames et al.: J. Chem. Soc., pages 3388–3398 (1959).

Cram et al.: Organic Chemistry, McGraw-Hill Book Co., Inc., New York, 1959, pages 225–226.

Grinev et al.: Daklady Akad. Nauk S.S.R., vol. 121, 862-4 (1959).

Heinzelman et al.: J. Org. Chem., vol. 25, pages 1548–1558 (1960).

Julia: Compt. Rendus, vol. 250, No. 9, pages 1741–1743 (1960).

Theilheimer: Synthetic Methods of Organic Chemistry, S. Karger, New York, vol. 7, 1953, page 319, par. 826.

Troxler et al.: Helv. Chem. Acta., vol. 42, pages 2080–2096 (1959).

NICHOLAS S. RIZZO, *Primary Examiner.*

IRVING MARCUS, *Examiner.*